US009201153B2

(12) United States Patent
Fletcher et al.

(10) Patent No.: US 9,201,153 B2
(45) Date of Patent: Dec. 1, 2015

(54) METHODS AND DEVICES FOR TRANSFORMATION OF COLLECTED DATA FOR IMPROVED VISUALIZATION CAPABILITY

(75) Inventors: Robin Fletcher, Guildford (GB); David Nichols, Palo Alto, CA (US); Maud Cavalca, Redhill (GB)

(73) Assignee: WESTERNGECO L.L.C., Houston, TX (US)

( * ) Notice: Subject to any disclaimer, the term of this patent is extended or adjusted under 35 U.S.C. 154(b) by 878 days.

(21) Appl. No.: 13/286,574

(22) Filed: Nov. 1, 2011

(65) Prior Publication Data

US 2013/0107665 A1    May 2, 2013

(51) Int. Cl.
*G01V 1/36* (2006.01)
*G01V 1/30* (2006.01)

(52) U.S. Cl.
CPC *G01V 1/36* (2013.01); *G01V 1/301* (2013.01); *G01V 1/362* (2013.01); *G01V 2210/51* (2013.01); *G01V 2210/584* (2013.01); *G01V 2210/614* (2013.01); *G01V 2210/67* (2013.01); *G01V 2210/679* (2013.01); *G01V 2210/74* (2013.01)

(58) Field of Classification Search
CPC .............. G01V 1/362; G01V 2210/51; G01V 2210/67; G01V 2210/679
USPC .................................................... 367/50–54
See application file for complete search history.

(56) References Cited

U.S. PATENT DOCUMENTS

| 5,920,828 | A | 7/1999 | Norris et al. | |
|---|---|---|---|---|
| 6,931,324 | B2 | 8/2005 | Taner et al. | |
| 8,385,151 | B2 * | 2/2013 | Liu | 367/50 |
| 2007/0064530 | A1 | 3/2007 | Moore | |
| 2009/0135670 | A1 | 5/2009 | Deffenbaugh et al. | |
| 2011/0211761 | A1 | 9/2011 | Wang | |
| 2012/0236685 | A1 * | 9/2012 | Shan et al. | 367/50 |

FOREIGN PATENT DOCUMENTS

WO    2006025823 A1    3/2006

OTHER PUBLICATIONS

Bickel, S. H., and R. R. Natarajan, 1985, Plane-wave Q-deconvolution: Geophysics, 50, 1426-1439.
Carcione, J. M., D. Kosloff, and R. Kosloff, 1988, Viscoacoustic wave propagation simulation in the earth: Geophysics, 53, 769-777.
(Continued)

*Primary Examiner* — Ian J Lobo
(74) *Attorney, Agent, or Firm* — Abimbola Bukoye; Gary Gex (57) ABSTRACT

Computing systems and methods for improving imaging of collected data are disclosed. In one embodiment, a first wavefield is propagated to obtain a first wavefield history; the first wavefield is again propagated to obtain a second wavefield history, wherein the propagation includes integration of one or more Q-effects; a first attenuated traveltime history is estimated based at least in part on the first and second wavefield histories; a first Q-model filter is calculated based at least in part on the first estimated attenuated traveltime; and a first adjusted wavefield is generated based at least in part on application of the first Q-model filter to the first wavefield. In some embodiments, an image is generated based at least on a first adjusted wavefield and a second wavefield.

13 Claims, 9 Drawing Sheets

(56) References Cited

OTHER PUBLICATIONS

Carcione, J. M., 2010, A generalization of the Fourier pseudospectral method: Geophysics, 75, A53-A56.

Causse, E., and B. Ursin, 2000, Viscoacoustic reverse-time migration: Journal of Seismic Exploration, 9, 165-184.

Cavalca, M., and R. Fletcher, 2009, Estimation of the near-surface Q distribution from pre-stack surface seismic data: SEG/EAGE Research Workshop, Barcelona, Expanded Abstracts.

Cavalca, M., I. Moore, L. Zhang, S. L Ng, R. Fletcher and M. Bayly, 2011, Ray-based tomography for Q-estimation and Q-compensation in complex media: 73rd EAGE Conference & Exhibition, Extended Abstracts.

Deng, F., and G. A. McMechan, 2007, True-amplitude prestack depth migration: Geophysics, 72, 5155-5166.

Ferber, R., 2005, A filter bank solution to absorption simulation and compensation: 75th Annual International Meeting, SEG, Expanded Abstracts, 2170-2172.

Fletcher, R. P., X. Du, and P. J. Fowler, 2009, Reverse time migration in titled transversely isotropic (TTI) media: Geophysics, 74, 179-187.

Fowler, P. J., X. Du, and R. P. Fletcher, 2010a, Coupled equations for reverse time migration in transversely isotropic media: Geophysics, 75, 11-22.

Fowler, P. J., X. Du, and R. P. Fletcher, 2010b, Recursive integral time extrapolation methods for scalar waves: 80th Annual International Meeting, SEG, Expanded Abstracts, 3210-3215.

Hargreaves, N. D., and A. J. Calvert, 1991, Inverse Q filtering by Fourier transform: Geophysics, 56, 519-527.

Robertsson, J. O. A., J. O. Blanch, and W. W. Symes, 1994, Viscoelastic finite-difference modelling: Geophysics, 59, 1444-1456.

Yu, Y., R. S. Lu, and M. D. Deal, 2002, Compensation for the effects of shallow gas attenuation with viscoacoustic wave equation migration: 72nd Annual International Meeting, SEG, Expanded Abstracts, 2062-2065.

Zhang, Y., P. Zhang, and H. Zhang, 2010, Compensating for viscoacoustic effects in reverse-time migration: 80th Annual International Meeting, SEG, Expanded Abstracts.

International Search Report and Written Opinion dated Feb. 26, 2013, issued in International Application No. PCT/US2012/062944 filed Nov. 1, 2012 (9 pages).

\* cited by examiner

| 702 | Propagate a first wavefield to obtain a first wavefield history. |

| 704 | The first wavefield is a source wavefield, and propagation of the first wavefield to obtain a first wavefield history includes forward propagation. |

| 706 | The first wavefield is a receiver wavefield, and propagation of the first wavefield to obtain a first wavefield history includes backward propagation. |

| 708 | The first wavefield is ordered based on time as a fast dimension. |

| 710 | Propagate the first wavefield to obtain a second wavefield history, wherein the propagation includes integration of one or more Q-effects. |

| 711 | The one or more Q-effects are selected from the group consisting of attenuation, absorption, dissipation, and visco-acoustic effects. |

| 712 | Estimate a first attenuated traveltime based at least in part on the first and second wavefield histories. |

| 714 | Calculate a first Q-model filter based at least in part on the first estimated attenuated traveltime. |

| 715 | The first Q-model filter is configured to compensate for one or more attributes to be integrated along a wavepath corresponding at least in part to the first wavefield. |

| 716 | Generate a first adjusted wavefield based at least in part on application of the first Q-model filter to the first wavefield. |

| 718 | Generate an image based at least in part on the first adjusted wavefield and a second wavefield. |

| 719 | Before generating the image, scale the first adjusted wavefield to generate a scaled first adjusted wavefield that is used to generate the image. |

Propagate a second wavefield to obtain a third wavefield history; propagate the second wavefield to obtain a fourth wavefield history, wherein the propagation includes integration of one or more Q-effects; estimate a second attenuated traveltime history based at least in part on the third and fourth wavefield histories; calculate a second Q-model filter based at least in part on the second estimated attenuated traveltime history; and generate a second adjusted wavefield based at least in part on application of the second Q-model filter to the second wavefield. — 720

Generate an image based at least in part on the first wavefield and the second adjusted wavefield. — 722

Generate an image based at least in part on the first adjusted wavefield and the second adjusted wavefield. — 724

Before generating the image, scale the first and second adjusted wavefields to generate scaled first and second adjusted wavefields, respectively, that are used to generate the image. — 725

Scale the first Q-model filter to generate a scaled Q-model filter; generate a third adjusted wavefield based at least in part on application of the scaled Q-model filter to the first wavefield; and generate an image based at least in part on the third adjusted wavefield and a second wavefield — 726

- 802 Propagate a first wavefield to obtain a first wavefield history.
- 804 Propagate a second wavefield to obtain a second wavefield history, wherein the propagation includes modification of at least a part of the second wavefield through use of a spatial function, and wherein the propagation of the first and second wavefields use substantially the same starting conditions.
  - 806 The use of the spatial function during propagation of the second wavefield includes multiplying by the spatial function to obtain the second wavefield history.
  - 808 The spatial function is configured to generate an approximation to an integral of a selected function over a wavepath corresponding at least in part to the first wavefield.
    - 810 The generation of the approximation is based at least in part on computing a ratio of the first and second wavefields.
    - 812 The integration is over space.
    - 814 The integration is over time.
  - 816 The modification of the part of the second wavefield includes changing the amplitude of the second wavefield.

Figure 8

METHODS AND DEVICES FOR TRANSFORMATION OF COLLECTED DATA FOR IMPROVED VISUALIZATION CAPABILITY

TECHNICAL FIELD

The disclosed embodiments relate generally to data analysis, and more particularly, to computing systems and methods for improving imaging of collected data, including, but not limited to, migration of collected seismic data.

BACKGROUND

Attenuation and wavelet distortion have been observed on seismic data due to anelastic properties of the earth. For example, strong attenuation of seismic P-waves can result from gas trapped in overburden structures. As a result, not only is the migrated amplitude below the gas anomaly dim, but also the imaging resolution is greatly reduced by the high frequency energy loss and the phase distortion. In seismic processing, mitigating these undesirable effects can improve a final image and make it easier to interpret.

In complex media, Q-effect compensation techniques that do not take into account the wavepath or raypath information usually fail at mitigating Q-effects properly. As one-way wave equation migrations are formulated in the frequency domain, one can address frequency dependent dissipation. Reverse-time migration ("RTM") that is based on directly solving the two-way wave equation has provided a superior way to image complex geologic regions, and has recently become a standard migration tool for subsalt imaging. One can also incorporate Q-effect correction capabilities into a frequency domain implementation of RTM. To incorporate Q-effect correction capabilities into a conventional implementation of RTM, however, there is a need to formulate a time domain wave equation to model the Q-effect effects. Moreover, the backward propagation of the receiver wavefield in RTM that includes Q-effect correction can be improved by model amplification. Furthermore, in some instances, it can be desirable to approximate integration over a wavepath to improve imaging conditions, which can have applications going beyond Q-effect correction.

Accordingly, there is a need for methods and systems that can employ, more efficient, and more accurate methods for processing and imaging of collected data, such as filtering wavefields to compensate for amplitude and/or phase effects before imaging. Such methods and systems may complement or replace conventional methods and systems for processing and imaging collected data.

SUMMARY

The above deficiencies and other problems associated with processing and imaging collected data are reduced or eliminated by the disclosed methods and devices.

In accordance with some embodiments, a method is performed at least by propagating a first wavefield to obtain a first wavefield history; propagating the first wavefield to obtain a second wavefield history, wherein the propagation includes integration of one or more Q-effects; estimating a first attenuated traveltime history based at least in part on the first and second wavefield histories; calculating a first Q-model filter based at least in part on the first estimated attenuated traveltime history; and generating a first adjusted wavefield based at least in part on application of the first Q-model filter to the first wavefield.

In accordance with some embodiments, a computing system is provided that includes at least one processor, at least one memory, and one or more programs stored in the at least one memory, wherein the one or more programs are configured to be executed by the one or more processors, the one or more programs including instructions for propagating a first wavefield to obtain a first wavefield history; propagating the first wavefield to obtain a second wavefield history, wherein the propagation includes integration of one or more Q-effects; estimating a first attenuated traveltime history based at least in part on the first and second wavefield histories; calculating a first Q-model filter based at least in part on the first estimated attenuated traveltime history; and generating a first adjusted wavefield based at least in part on application of the first Q-model filter to the first wavefield.

In accordance with some embodiments, a computer readable storage medium having a set of one or more programs including instructions that when executed by a computing system cause the computing system to: propagate a first wavefield to obtain a first wavefield history; propagate the first wavefield to obtain a second wavefield history, wherein the propagation includes integration of one or more Q-effects; estimate a first attenuated traveltime history based at least in part on the first and second wavefield histories; calculate a first Q-model filter based at least in part on the first estimated attenuated traveltime history; and generate a first adjusted wavefield based at least in part on application of the first Q-model filter to the first wavefield.

In accordance with some embodiments, a system includes at least one processor, at least one memory, and one or more programs stored in the at least one memory; and means for propagating a first wavefield to obtain a first wavefield history; means for propagating the first wavefield to obtain a second wavefield history, wherein the propagation includes integration of one or more Q-effects; means for estimating a first attenuated traveltime history based at least in part on the first and second wavefield histories; means for calculating a first Q-model filter based at least in part on the first estimated attenuated traveltime history; and means for generating a first adjusted wavefield based at least in part on application of the first Q-model filter to the first wavefield.

In accordance with some embodiments, an information processing apparatus for use in a computing system includes means for propagating a first wavefield to obtain a first wavefield history; means for propagating the first wavefield to obtain a second wavefield history, wherein the propagation includes integration of one or more Q-effects; means for estimating a first attenuated traveltime history based at least in part on the first and second wavefield histories; means for calculating a first Q-model filter based at least in part on the first estimated attenuated traveltime history; and means for generating a first adjusted wavefield based at least in part on application of the first Q-model filter to the first wavefield.

In some embodiments, an aspect of the invention involves generating an image based at least in part on the first wavefield and the second adjusted wavefield.

In some embodiments, an aspect of the invention involves propagating a second wavefield to obtain a third wavefield history; propagating the second wavefield to obtain a fourth wavefield history, wherein the propagation includes integration of one or more Q-effects; estimating a second attenuated traveltime history based at least in part on the third and fourth wavefield histories; calculating a second Q-model filter based at least in part on the second estimated attenuated traveltime history; and generating a second adjusted wavefield based at least in part on application of the second Q-model filter to the second wavefield.

In some embodiments, an aspect of the invention involves generating an image based at least in part on the first wavefield and the second adjusted wavefield.

In some embodiments, an aspect of the invention involves generating an image based at least in part on the first adjusted wavefield and the second adjusted wavefield.

In some embodiments, an aspect of the invention involves before generating the image, scaling the first and second adjusted wavefields to generate scaled first and second adjusted wavefields, respectively, that are used to generate the image.

In some embodiments, an aspect of the invention includes that the first wavefield is a source wavefield, and propagation of the first wavefield to obtain a first wavefield history includes forward propagation.

In some embodiments, an aspect of the invention includes that the first wavefield is a receiver wavefield, and propagation of the first wavefield to obtain a first wavefield history includes backward propagation.

In some embodiments, an aspect of the invention includes that the first wavefield is ordered based on time as a fast dimension.

In some embodiments, an aspect of the invention involves scaling the first Q-model filter to generate a scaled Q-model filter; generating a third adjusted wavefield based at least in part on application of the scaled Q-model filter to the first wavefield; and generating an image based at least in part on the third adjusted wavefield and a second wavefield.

In some embodiments, an aspect of the invention involves before generating the image, scaling the first adjusted wavefield to generate a scaled first adjusted wavefield that is used to generate the image.

In some embodiments, an aspect of the invention includes that the one or more Q-effects are selected from the group consisting of attenuation, absorption, dissipation, and visco-acoustic effects.

In some embodiments, an aspect of the invention includes that the first Q-model filter is configured to compensate for one or more attributes to be integrated along a wavepath corresponding at least in part to the first wavefield.

In accordance with some embodiments, a method is performed that includes propagating a first wavefield to obtain a first wavefield history; and propagating a second wavefield to obtain a second wavefield history, wherein the propagation includes modification of at least a part of the second wavefield through use of a spatial function, wherein the propagation of the first and second wavefields use substantially the same starting conditions.

In accordance with some embodiments, a computing system is provided that includes at least one processor, at least one memory, and one or more programs stored in the at least one memory, wherein the one or more programs are configured to be executed by the one or more processors, the one or more programs including instructions for propagating a first wavefield to obtain a first wavefield history; and propagating a second wavefield to obtain a second wavefield history, wherein the propagation includes modification of at least a part of the second wavefield through use of a spatial function, wherein the propagation of the first and second wavefields use substantially the same starting conditions.

In accordance with some embodiments, a computer readable storage medium having a set of one or more programs including instructions that when executed by a computing system cause the computing system to: propagate a first wavefield to obtain a first wavefield history; and propagate a second wavefield to obtain a second wavefield history, wherein the propagation includes modification of at least a part of the second wavefield through use of a spatial function, wherein the propagation of the first and second wavefields use substantially the same starting conditions.

In accordance with some embodiments, a system includes at least one processor, at least one memory, and one or more programs stored in the at least one memory; and means for propagating a first wavefield to obtain a first wavefield history; and means for propagating a second wavefield to obtain a second wavefield history, wherein the propagation includes modification of at least a part of the second wavefield through use of a spatial function, wherein the propagation of the first and second wavefields use substantially the same starting conditions.

In accordance with some embodiments, an information processing apparatus for use in a computing system includes means for propagating a first wavefield to obtain a first wavefield history; and means for propagating a second wavefield to obtain a second wavefield history, wherein the propagation includes modification of at least a part of the second wavefield through use of a spatial function, wherein the propagation of the first and second wavefields use substantially the same starting conditions.

In some embodiments, an aspect of the invention includes that the use of the spatial function during propagation of the second wavefield includes multiplying by the spatial function to obtain the second wavefield history.

In some embodiments, an aspect of the invention includes that the spatial function is configured to generate an approximation to an integral of a selected function over a wavepath corresponding at least in part to the first wavefield.

In some embodiments, an aspect of the invention includes that the generation of the approximation is based at least in part on computing a ratio of the first and second wavefields.

In some embodiments, an aspect of the invention includes that the integration is over space.

In some embodiments, an aspect of the invention includes that the integration is over time.

In some embodiments, an aspect of the invention includes that the modification of the part of the second wavefield includes changing the amplitude of the second wavefield.

Thus, the systems and methods disclosed herein are more efficient and/or effective methods for processing and imaging collected data. These systems and methods increase processing and imaging effectiveness, efficiency, and accuracy. Such methods and systems may complement or replace conventional methods for processing and imaging collected data.

BRIEF DESCRIPTION OF THE DRAWINGS

For a better understanding of the aforementioned embodiments as well as additional embodiments thereof, reference should be made to the Description of Embodiments below, in conjunction with the following drawings in which like reference numerals refer to corresponding parts throughout the figures.

DESCRIPTION OF EMBODIMENTS

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Moreover, it will be understood that any description of methods (and computing systems or other devices that employ such methods) as including one or more features, steps, operations, elements, components, and/or groups thereof, does not preclude the alteration and/or reorganization of such one or more features, steps, operations, elements, components, and/or groups.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Figure 1:
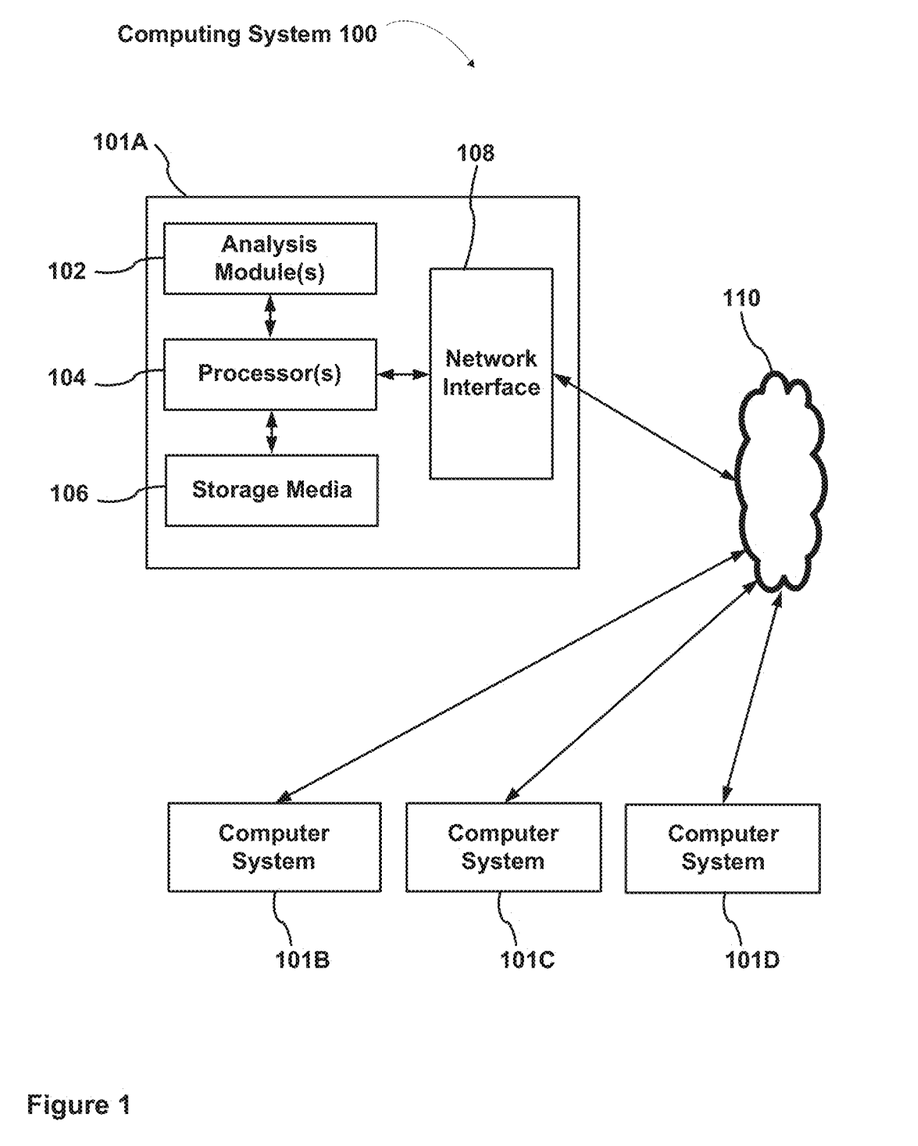
FIG. 1 illustrates a computing system in accordance with some embodiments.

FIG. 1 depicts an example computing system 100 in accordance with some embodiments. The computing system 100 can be an individual computer system 101A or an arrangement of distributed computer systems. The computer system 101A includes one or more analysis modules 102 that are configured to perform various tasks according to some embodiments, such as the tasks depicted in FIGS. 2, 7, and 8. To perform these various tasks, analysis module 102 executes independently, or in coordination with, one or more processors 104, which is (or are) connected to one or more storage media 106. The processor(s) 104 is (or are) also connected to a network interface 108 to allow the computer system 101A to communicate over a data network 110 with one or more additional computer systems and/or computing systems, such as 101B, 101C, and/or 101D (note that computer systems 101B, 101C and/or 101D may or may not share the same architecture as computer system 101A, and may be located in different physical locations, e.g. computer systems 101A and 101B may be on a ship underway on the ocean, while in communication with one or more computer systems such as 101C and/or 101D that are located in one or more data centers on shore, other ships, and/or located in varying countries on different continents).

A processor can include a microprocessor, microcontroller, processor module or subsystem, programmable integrated circuit, programmable gate array, or another control or computing device.

The storage media 106 can be implemented as one or more computer-readable or machine-readable storage media. Note that while in the example embodiment of FIG. 1 storage media 106 is depicted as within computer system 101A, in some embodiments, storage media 106 may be distributed within and/or across multiple internal and/or external enclosures of computing system 101A and/or additional computing systems. Storage media 106 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 100 is only one example of a computing system, and that computing system 100 may have more or fewer components than shown, may combine additional components not depicted in the example embodiment of FIG. 1, and/or computing system 100 may have a different configuration or arrangement of the components depicted in FIG. 1. The various components shown in FIG. 1 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Attention is now directed to examples of some equations that can be used to calculate, estimate, or derive various metrics in the workflows discussed here.

In some embodiments, an attenuated traveltime, t*t*, can be calculated, estimated, and/or derived from equation 1, which can be expressed as:

$$t^* = \int_{path} \frac{Q^{-1}(s)}{v(s)} ds = \int_{path} Q^{-1}(t) dt$$

where v represents velocity, Q characterizes Q-effect, t represents time, and s represents space. The attenuated traveltime integrates the effects of both velocity, v, and Q-effects along the propagation path. In some embodiments that utilize ray-based modelling, the attenuated traveltime can be easily computed by reintegrating Q along a traced ray. Moreover, in some embodiments, an estimate of attenuated traveltime can be computed for the full wavefield (at all, or substantially all, points in space, x, and time, t) by running two modelling experiments (either in parallel or sequentially).

In some embodiments, finite-difference modeling of the scalar acoustic wave on a second-order in time basist*, can be calculated, estimated, and/or derived from equation 2, which can be expressed as:

$$P(x;t+dt) = 2P(x;t) - P(x;t-dt) + dt^2 v(x)^2 \nabla^2 P(x;t)$$

where dt is the time step. In some embodiments, modeling is performed on a second-order in time basis.

In some embodiments, an additional modeling experiment can be used to integrate Q-effects over time, and can be calculated, estimated, and/or derived from the group of equations 3, which can be expressed as:

$$P_Q(x;t+dt) = 2P_Q(x;t) - P_Q(x;t-dt) + dt^2 v(x)^2 \nabla^2 P_Q(x;t)$$

$$P_Q(x;t+dt) = P_Q(x;t+dt) \times e^{-\alpha dt/Q(x)}$$

$$P_Q(x;t) = P_Q(x;t) \times e^{-\alpha dt/Q(x)}$$

where α is a constant scalar.

In some embodiments, a transformation of two wavefields P and $P_Q$ can provide an estimate of an attenuated traveltime at a point in space and time that the wavefield experiencedt*, and this estimate can be calculated, estimated, and/or derived from equation 4, which can be expressed as:

$$t^*(x;t) = \frac{1}{\alpha} \ln\left(\frac{P(x;t)}{P_Q(x;t)}\right)$$

In some embodiments, attenuated traveltimes from equation 4 may be used to design Q-modeling/compensation filters, which can be calculated, estimated, and/or derived from equation 5, which can be expressed as:

$$F(t^*, \omega) = \exp\left\{\mp \omega \frac{t^*}{2} \pm i\omega \frac{t^*}{\pi} \ln\left(\frac{\omega}{\omega_0}\right)\right\}$$

where ω is angular frequency and $\omega_0$ is a reference angular frequency. In some embodiments, these filters can be applied to the wavefield, P, from the modelling in equation (2) to simulate modelling/compensation of Q-effects.

Figure 2:
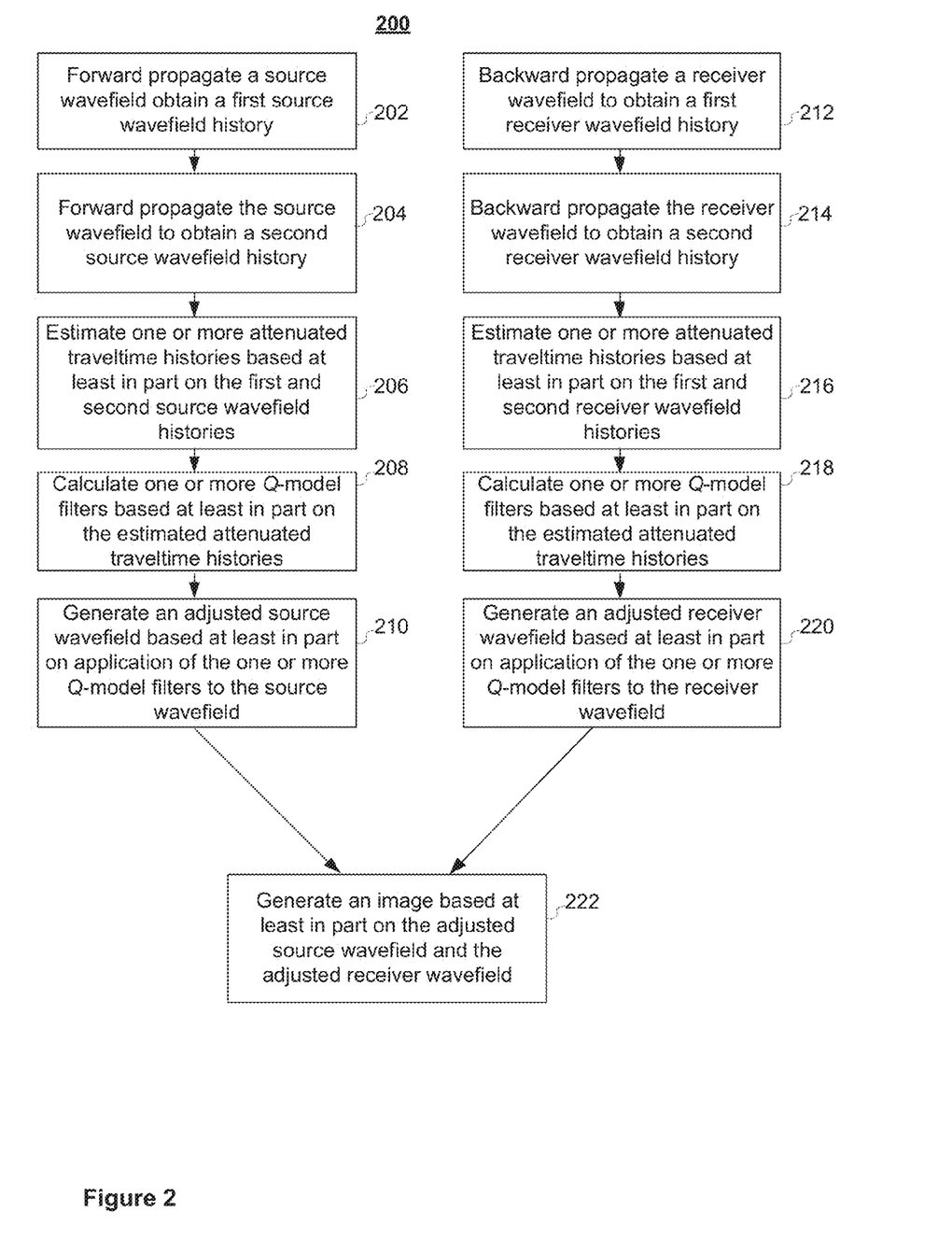
FIG. 2 illustrates a migration workflow in accordance with some embodiments.

Attention is now directed to FIG. 2, which illustrates a workflow 200 for migration according to some embodiments, and which may be implemented on a computing system such as computing system 100 of FIG. 1.

In one aspect, an example process of migration uses a workflow as illustrated in FIG. 2. However, neither the techniques disclosed herein, nor this embodiment in particular, are restricted to this specific migration process; rather, the disclosed embodiments can be applied successfully to any imaging procedure for a subsurface region where compensation for Q-effects or other factors may be desirable, including without limitation the following examples: time-domain visco-acoustic modeling, time-domain visco-acoustic full waveform inversion, simulation of isotropic visco-elastic propagation through mode separation (e.g., using div and/or curl operators), and integration of the effect of S-wave Q-effects and P-wave Q-effects at one or more time steps. Indeed, the techniques can be successfully applied to propagation of any scalar wavefield, not just acoustic wavefields.

Moreover, those with skill in the art will appreciate that many embodiments of the workflows and methods discussed below, e.g., workflow 200 and method 700, compensate for one or more of the following Q-effects including, but not limited to, attenuation, absorption, dissipation, visco-acoustic effects, and other anomalies related to spatial attributes that may be encountered during migration of collected data.

FIG. 2 illustrates a workflow where, initially, a source wavefield of collected data that corresponds to a subsurface region (e.g., collected seismic data representing a subterranean region being explored for hydrocarbons) is forward propagated to obtain a first source wavefield history (202). In some embodiments, equation 2 as discussed above can be used, though those with skill in the art will recognize that variations of equation 2, as well as alternative methods of obtaining the first source wavefield history, may be successfully performed. In practice, any acoustic modelling algorithm that steps the wavefield in time, including anisotropic acoustic modelling using coupled equations or any recursive integral time extrapolation algorithm, may be successfully employed.

The source wavefield is again forward propagated to obtain a second source wavefield history (204). In some embodiments, the second source wavefield history integrates one or more Q-effects. In some embodiments, equation 3 as discussed above can be used, though those with skill in the art will recognize that variations of equation 3, as well as alternative methods of obtaining the second source wavefield history, may be successfully performed. In some embodiments, the propagation includes modification of at least a part of the second wavefield through use of a spatial function, as discussed below.

Method 200 includes estimating one or more attenuated traveltime histories (206) based at least in part on the first and second source wavefield histories, and in some embodiments, equation 4 as discussed above can be used; in alternate embodiments, variations on equation 4 or alternative methods of estimating attenuated traveltimes can be used.

Calculation of one or more Q-model filters (208) based at least in part on the estimated attenuated traveltime histories is performed in some embodiments, and in some embodiments, equation 5 as discussed above can be used. In alternate embodiments, variations on equation 5, or alternative methods of calculating Q-model filters can be employed.

Figure 3:
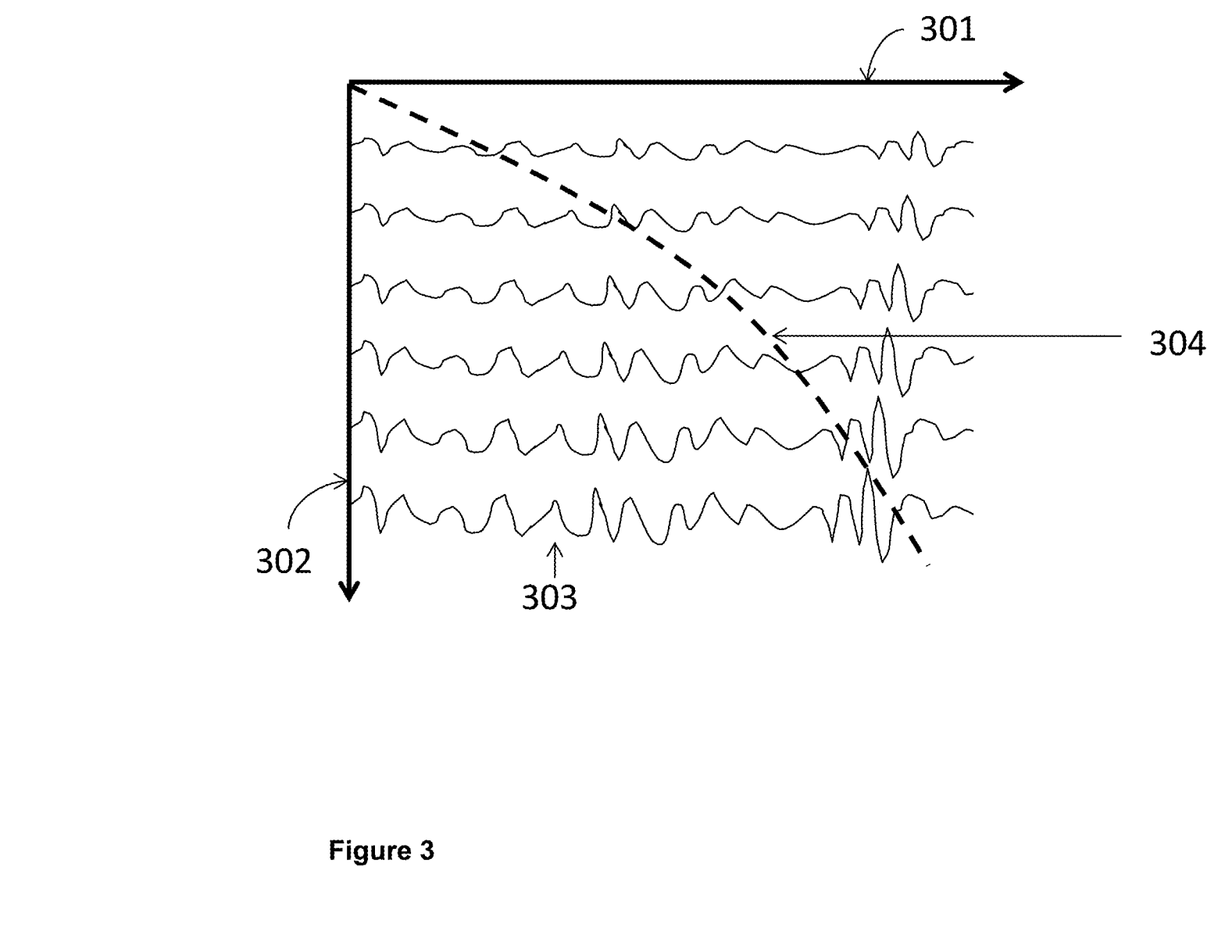
FIG. 3 illustrates a filter bank panel in accordance with some embodiments.

In some embodiments, Q-model filters are applied using a filter bank of time-invariant absorption filters for compensation of absorption effects on seismic traces. For example, FIG. 3 illustrates a panel 300 representative of a filter bank approach in accordance with some embodiments. The horizontal axis 301 represents time, and the vertical axis 302 represents the attenuated traveltime t*. For one or more points in space, a set of one or more time-invariant filters (characterized by t*) is applied to the first source wavefield in time; application of the time-invariant filters forms a panel of filtered wavefields 303. An adjusted source wavefield can then be derived by slicing through the panel 300 in accordance with the attenuated traveltime history. In other embodiments, any other suitable way of applying space- and time-variant non-stationary filters can be used, as those with skill in the art will appreciate.

Returning to FIG. 2, an adjusted source wavefield is generated (210) based at least in part on the application of one or more of the Q-model filters to the source wavefield. In some embodiments, a Q-model filter is applied to the wavefield, P that resulted from the modelling in step 202, (e.g., wavefield modelling performed using equation 2) to simulate modelling/compensation of Q-effects.

With respect to receiver wavefields, backward propagation is used in steps 212 and 214; otherwise, respective steps are analogous for source and receiver wavefields, e.g., step 206 for the source side and step 216 for the receiver side are analogous, and can use similar techniques as discussed above. As such, additional description of steps 212 through 220 will not be described in further detail.

In some embodiments, method 200 can also include the generation of an image (222) based at least in part on the adjusted source and receiver wavefields generated in steps 210 and 220, respectively. In some embodiments, the image generated is of a subterranean region that includes a region of potential interest for oil and/or gas production, where the wavefields used for imaging correspond at least in part to data acquired as part of a seismic survey. In some embodiments, the image generated is based at least in part on data acquired as part of a seismic survey of a subterranean region.

Note that in some embodiments, phase and amplitude filters are separately applied on a post-modelling basis to source and/or receiver wavefields before imaging, which enables efficient stabilization of an amplitude amplification filter without altering the phase compensation. Since there is explicit control of both phase and amplitude when filtering wavefields, applications beyond modelling and compensation for absorption effects are possible. For example, if one does not use the phase term in the Q-filters, one can control energy present in an image formed by reverse time migration ("RTM") (e.g., consider a salt flank illuminated from above (through a portion of salt whose shape we are unsure about) and from below (through the sediments)). By forcing a part of the model where there is uncertainty to have a very low Q-value, a RTM image of the reflector just illuminated from below can be generated. Another example may be weighting data for inversion, such as full waveform inversion (FWI) (e.g., a velocity model and an uncertainty indicia reflecting confidence or probability of accuracy of the velocity model, can be translated into a Q-model (e.g., a low Q may reflect high confidence). Based on this Q-model, amplitude filters are calculated and applied to the data residual in FWI to focus the inversion on specific regions of the model that require review and/or revision.

Moreover, method 200, and variations thereof, enable production of a suite of images using different percentages of an original Q-model with little extra computational cost.

Figure 4:
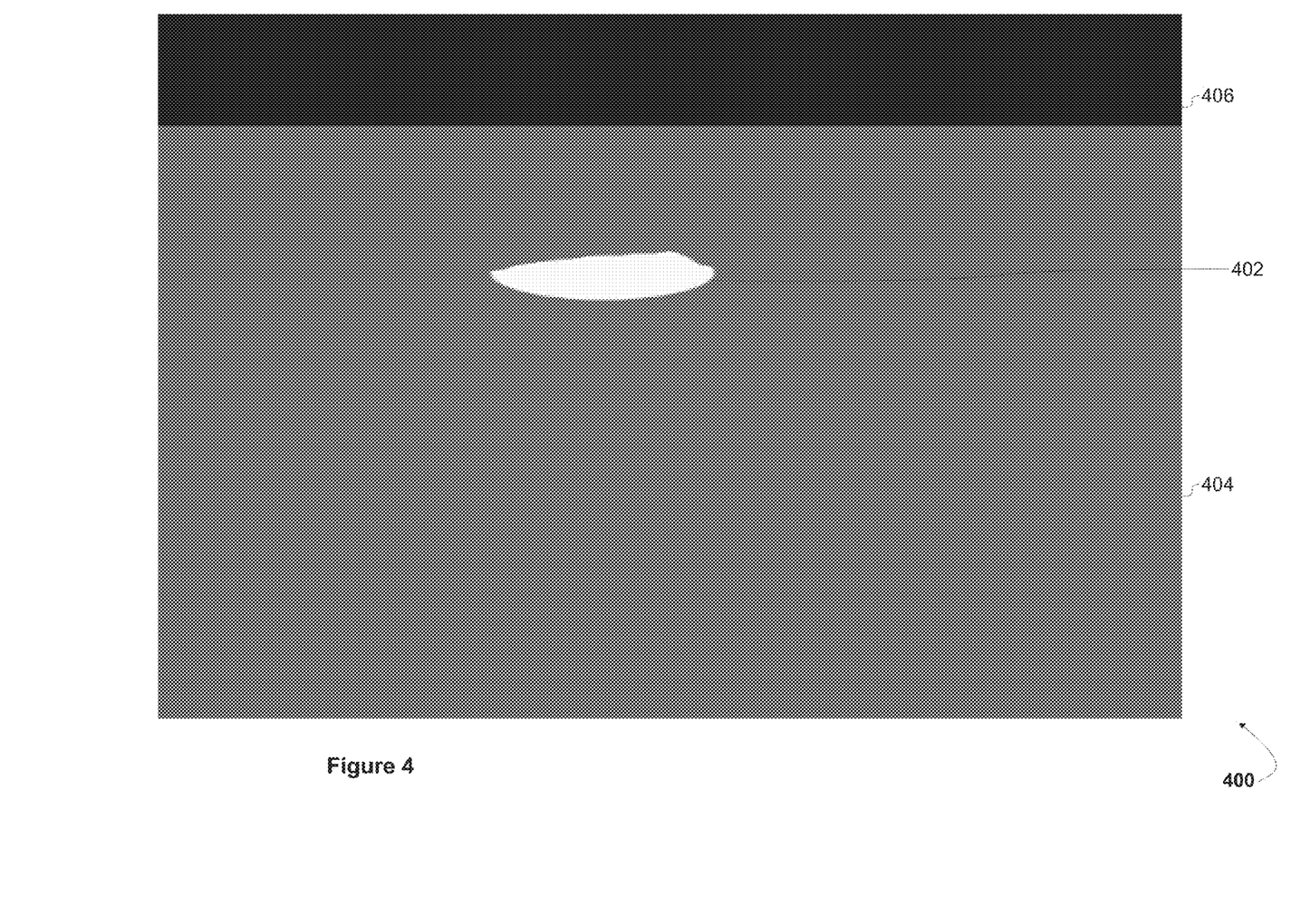
FIG. 4 illustrates an interval Q-model.
Figure 5:
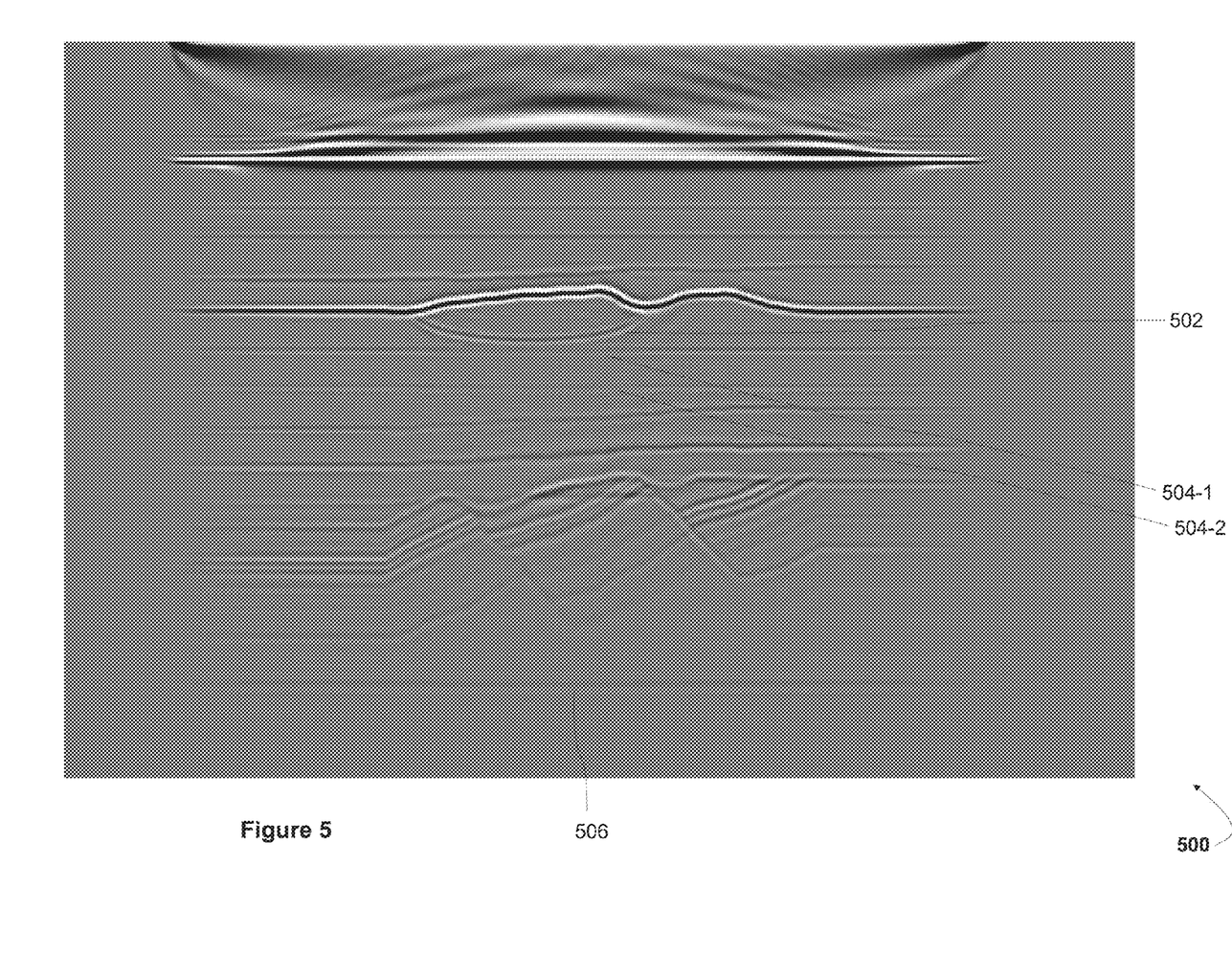
FIG. 5 illustrates the result of applying prestack RTM.
Figure 6:
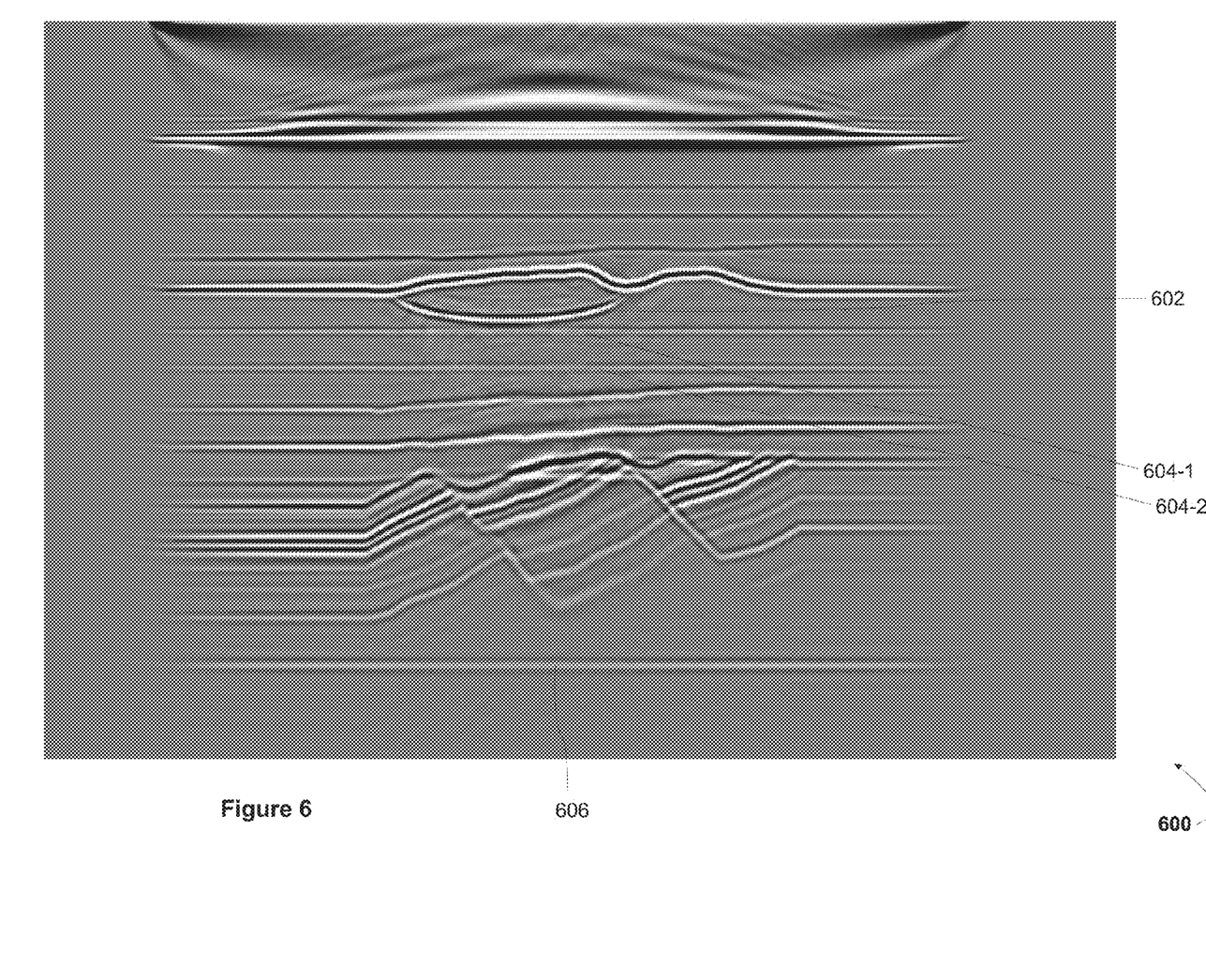
FIG. 6 illustrates the result of applying prestack visco-acoustic RTM in accordance with some embodiments.

Attention is now directed to FIGS. 4-6, which illustrate an example depicting the results of using one embodiment of workflow 200. Specifically, FIGS. 4-6 illustrate an example of using method 200 with a Q-effect model that is based on data corresponding to a geological area. In some embodiments, a velocity model with high spatial variability, and which corresponds to the geographical area, can be used in accordance with various embodiments disclosed herein.

FIG. 4 displays an interval Q-model 400 that includes a very low (Q=20) anomaly 402 (simulating the gas pocket), which is embedded in an attenuating background 404 (Q=120) below the water layer 406 (Q=5000). In this particular example, prestack synthetic data was generated using a Q-effect finite-difference algorithm, and one hundred and fifty shot gathers were modelled.

FIG. 5 displays the result of applying prestack RTM (500). The effect of the Q-anomaly 502 can be seen in a dimming of amplitudes along reflectors underneath the anomaly (e.g., 504-1, 504-2), as well as clear evidence of phase distortions (most notably in the sag on the base reflector 506).

FIG. 6 displays the result of applying prestack Q-effect RTM (600) using the method described above. Both the images in FIGS. 5 and 6 are displayed on the same scale and the water bottom (which is not affected by Q) is consistent between both. Reflectors beneath the water layer can be seen to differ. As the background Q represents fairly strong attenuation, the Q-effect amplitudes are noticeably compensated for amplitude and phase. The effect of the very low (Q=20) anomaly 602 is less visible in the image, with less dimming of amplitudes along reflectors underneath the anomaly (e.g., 604-1, 604-2) and more consistent phase (most notably the sag on the base reflector 606 has been removed).

Figure 7A:
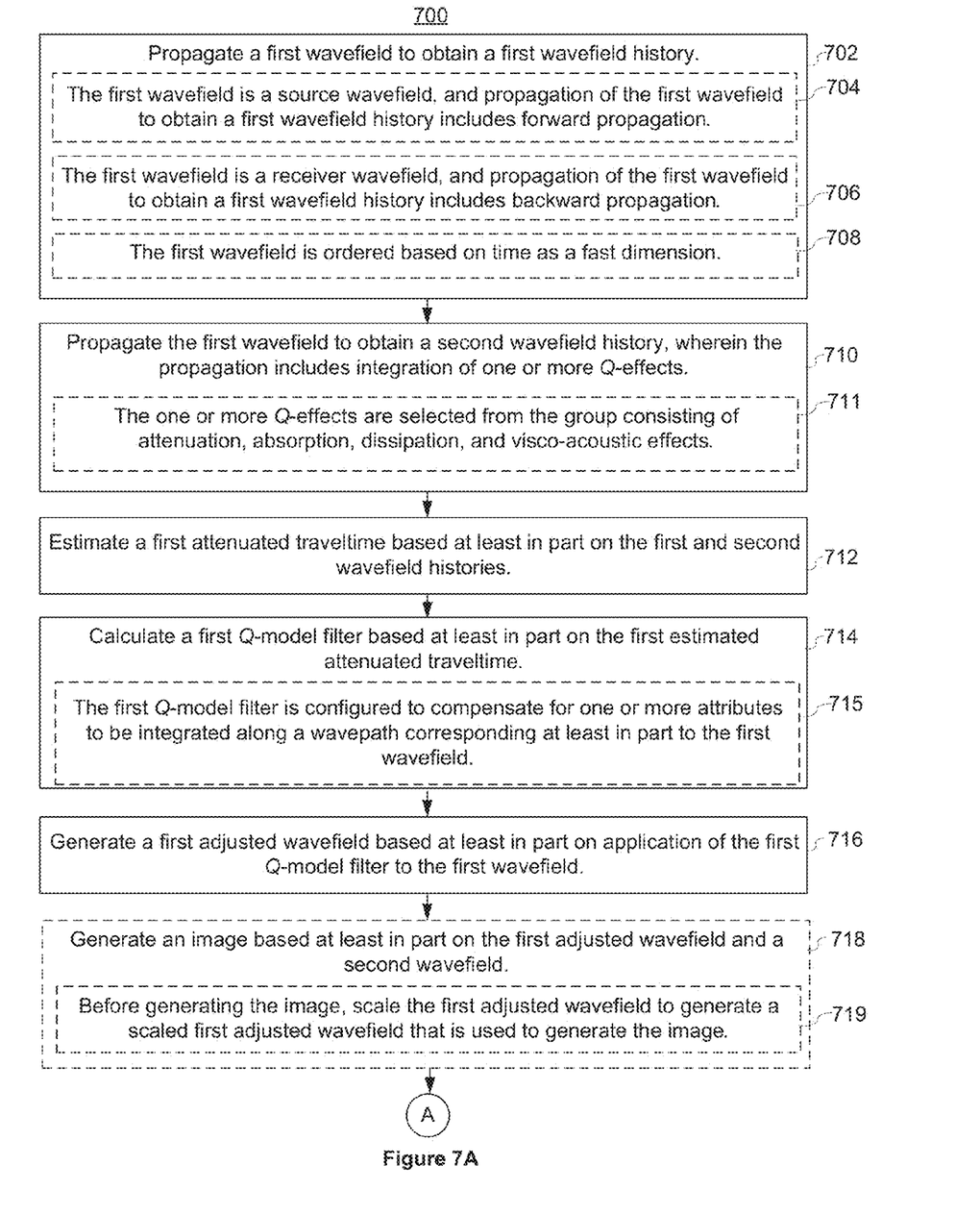
FIGS. 7A-7B are flow diagrams illustrating a method of processing and imaging collected data in accordance with some embodiments.
Figure 7B:
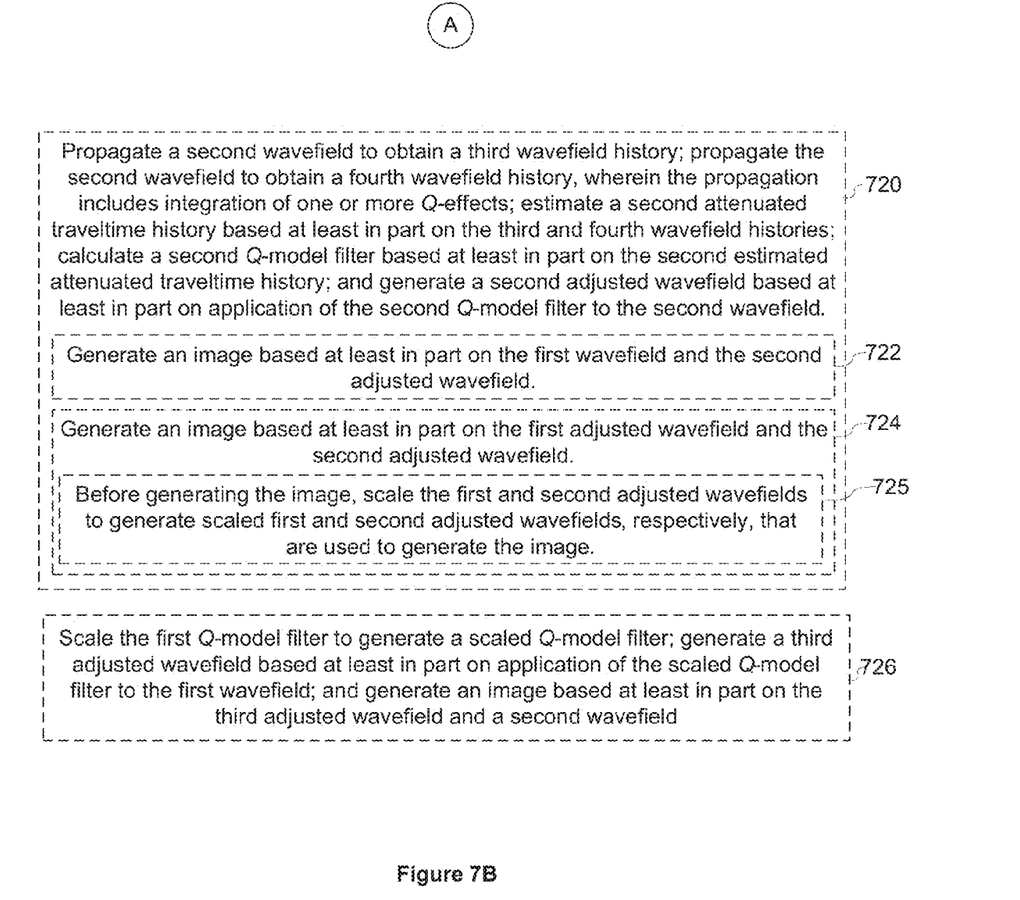

Attention is now directed to FIGS. 7A-7B, which are flow diagrams illustrating a method of processing and imaging collected data in accordance with some embodiments. Some operations in method 700 may be combined and/or the order of some operations may be changed. Further, some operations in method 700 may be combined with aspects of the example workflows of FIG. 2 and/or FIG. 8, and/or the order of some operations in method 700 may be changed to account for incorporation of aspects of the workflow illustrated by FIGS. 2 and/or 8.

It is important to recognize that geologic interpretations, velocity models and/or other interpretation aids may be refined in an iterative fashion; this concept is applicable to methods 200,700, and 800 as discussed herein. This can include use of feedback loops executed on an algorithmic basis, such as at a computing device (e.g., computing system 100, FIG. 1), and/or through manual control by a user who may make determinations regarding whether a given step, action, template, model, or set of curves has become sufficiently accurate for the evaluation of the subsurface three-dimensional geologic formation under consideration.

The method 700 is performed at a computing device (e.g., computing system 100, FIG. 1).

In general, method 700 includes receiving a first and a second wavefield comprising collected data that corresponds to a subsurface region. In some embodiments the subsurface region is a subterranean region, and the collected data is seismic data, although techniques of method 700 may be applied in other domains such as gravity, magnetics, etc.

The method 700 also includes propagating (702) a first wavefield to obtain a first wavefield history (e.g., FIG. 2, step 202, 212).

In some embodiments, the first wavefield is a source wavefield, and propagation of the first wavefield to obtain a first wavefield history includes forward propagation (704). In some embodiments, the first wavefield is a receiver wavefield, and propagation of the first wavefield to obtain a first wavefield history includes backward propagation (706). In some embodiments, the first wavefield is ordered based on time as a fast dimension (708).

The method 700 also includes propagating (710) the first wavefield to obtain a second wavefield history; this wavefield propagation includes integration of one or more Q-effects (e.g., FIG. 2, step 204, 214). In some embodiments, the one or more Q-effects are selected from the group consisting of attenuation, absorption, dissipation, and visco-acoustic effects (711).

The method 700 also includes estimating (712) a first attenuated traveltime history based at least in part on the first and second wavefield histories (e.g., FIG. 2, step 206, 216).

The method 700 also includes calculating (714) a first Q-model filter based at least in part on the first estimated attenuated traveltime history (e.g., FIG. 2, step 208, 218).

In some embodiments, the first Q-model filter is configured to compensate for one or more attributes to be integrated along a wavepath corresponding at least in part to the first wavefield (715); as a non-limiting example, the one or more attributes to be integrated along the wavepath may include uncertainty and/or any other relevant attribute as one with skill in the art will appreciate.

The method 700 also includes generating (716) a first adjusted wavefield based at least in part on application of the first Q-model filter to the first wavefield (e.g., FIG. 2, step 210, 220).

In some embodiments, method 700 also includes generating (718) an image of the subsurface region based at least in part on the first adjusted wavefield and a second wavefield (e.g., FIG. 2, step 222). In some embodiments, before generating the image, method 700 also includes scaling the first adjusted wavefield to generate a scaled first adjusted wavefield that is used to generate the image.

In some embodiments, the image generated is of a subterranean region that includes a region of potential interest for oil and/or gas production, where the wavefields used for imaging correspond at least in part to data acquired as part of a seismic survey. In some embodiments, the image generated is based at least in part on data acquired as part of a seismic survey of a subterranean region.

In some embodiments, method 700 also includes propagating a second wavefield to obtain a third wavefield history (e.g., FIG. 2, step 202, 212); propagating the second wavefield to obtain a fourth wavefield history, wherein the propagation includes integration of one or more Q-effects (e.g., FIG. 2, step 204, 214); estimating a second attenuated traveltime history based at least in part on the third and fourth wavefield histories (e.g., FIG. 2, step 206, 216); calculating a second Q-model filter based at least in part on the second estimated attenuated traveltime history (e.g., FIG. 2, step 208, 218); and generating a second adjusted wavefield based at least in part on application of the second Q-model filter to the second wavefield (e.g., FIG. 2, step 210, 220). (720)

In some embodiments, method 700 also includes generating (722) an image of the subsurface region based at least in part on the first wavefield and the second adjusted wavefield. In alternate embodiments, method 700 also includes generating (724) an image of the subsurface region based at least in part on the first adjusted wavefield and the second adjusted wavefield (e.g., FIG. 2, step 222). In some embodiments, before generating the image, method 700 also includes scaling (725) the first and second adjusted wavefields to generate scaled first and second adjusted wavefields, respectively, that are used to generate the image.

In some embodiments, method 700 also includes scaling the first Q-model filter to generate a scaled Q-model filter; generating a third adjusted wavefield based at least in part on application of the scaled Q-model filter to the first wavefield; and generating an image of the subsurface region based at least in part on the third adjusted wavefield and a second wavefield (726).

Attention is now directed to aspects of the disclosed embodiments related to approximating integration over a wavepath, though those with skill in the art will recognize that aspects of these techniques may be used in conjunction with and/or combined with the embodiments discussed above. Towards that end, examples of some equations are provided that can be used to calculate, estimate, or derive various metrics in the workflows discussed herein.

In ray based analysis of the earth, one can calculate the integral of a given spatial property over the raypath. In some embodiments, this can be an integral of a function over the length of the ray or an integral over time along the ray. In some embodiments, the two integrals can be related using the Jacobian, dl/dt, which is the local velocity. In some embodiments, the integral of a given spatial property over the raypath can be calculated, estimated, and/or derived according to group of equations 6:

$$I_t = \int_0^{t_{max}} f(x(t))\,dt$$

$$I_l = \int_0^{l_{max}} f(x(l))\,dl = \int_0^{t(l_{max})} f(x(t))\frac{dl}{dt}\,dt = \int_0^{t_{max}} f(x(t))v(x(t))\,dt$$

where x(l) or x(t) is location of the ray at length, l, or time, t. Some examples of this type of integral include, but are not limited to, the examples associated with equations 7 through 9.

In some embodiments, effective Q along a ray can be calculated, estimated, and/or derived from equation 7

$$t^* = \frac{t_{max}}{Q_{\mathit{eff}}} = \int_0^{t_{max}} \frac{1}{Q(x(t))}\,dt$$

In some embodiments, time perturbation along a ray can be calculated, estimated, and/or derived from equation 8:

$$\Delta t = \int_0^{l_{max}} \Delta s(x(l))\,dl$$

In some embodiments, uncertainty metric(s) along a ray can be calculated, estimated, and/or derived from equation 9:

$$U = \int_0^{l_{max}} \sigma^{-2}(x(l))\,dl$$

though those with skill in the art will recognize that many possible applications of this type of integral are appropriate for use in varying circumstances.

Moreover, one can use wave equation evaluation of time integrals for modeling and/or imaging where appropriate, and in such cases, it can be beneficial to evaluate integrals similar to the ray based integrals above. In some embodiments, an initial assumption is made that an evaluation of a wave equation using a time stepping algorithm is performed; in some embodiments, this can be calculated, estimated, and/or derived from equation 10:

$$U(t+\Delta t, x) = F(U(t \le t, x), c(x))$$

where a new field is calculated from the past field and earth properties, c(x).

In essence, a wave equation can be modified by a smoothly varying amplitude factor, A(x), at every time step (or at least a plurality of the time steps) of the wave equation without modifying the phase (and thus path) of the wave; in some embodiments, this can be calculated, estimated, and/or derived from group of equations 11:

$$T(t+\Delta t,x)=F(U_2(t\leq t,x),c(x))$$

$$U_2(t\leq t+\Delta t,x)=G(T((t+\Delta t,x)),U_2(t\leq t,x),A(x))$$

In this example, the wave paths in $U_2$ will be almost identical to the wave paths in U as long as the amplitude factor is sufficiently smooth. In the case of a first order partial differential equation solver, the function G will amount to multiplication by A(x); this can be calculated, estimated, and/or derived from group of equations 12:

$$T(t+\Delta t,x)=F(U_2(t,x),c(x))$$

$$U_2(t+\Delta t,x)=T(t+\Delta t,x)*A(x)$$

In this case, the amplitude of any particular portion of the wavefield will be approximately the original unmodified field multiplied by the product of the amplitude factors at the location of the wavefield at each time step; in some embodiments, this can be calculated, estimated, and/or derived from equation 13.

$$U_2(x,t) \cong U(x,t) \prod_{i=1}^{i=t/\Delta t} A(x'(t_i))$$

If the energy at time t, and location x, has a simple path from the source, then the product will be the product of A(x') for the locations x' that the wave passed through at each time step. If there are multiple paths, then the new field will be a sum of differently weighted waves.

One can then choose an amplitude factor that is related to the function to integrate over the path; in some embodiments, this can be calculated, estimated, and/or derived from equation 14:

$$A(x')=e^{-f(x')\Delta t}$$

which in some embodiments results in a product expressed and/or characterized from group of equations 15:

$$U_2(x,t) \cong U(x,t) \prod_{i=1}^{i=t/\Delta t} e^{-f(x')\Delta t} = e^{-\Sigma f(x')\Delta t}$$

and $$\ln\left\{\frac{U(x,t)}{U_2(x,t)}\right\} \cong \sum f(x')\Delta t \cong \int_0^t f(x'(t'))dt'$$

i.e. one can approximate the integral in time over the path of the wave by propagating a normal wavefield and a damped wavefield. In some embodiments, it may be desirable to stabilize the division in this equation by some local average in space and time of the numerator and denominator.

In some embodiments, one may calculate, estimate, and/or derive according to one or more of the following group of expressions 16:

$$\ln\left\{\frac{U(x,t)}{U_2(x,t)}\right\} \text{ or } \ln\left\{\frac{\langle U(x,t)\rangle}{\langle U_2(x,t)\rangle}\right\} \text{ or } \ln\left\{\frac{\langle U(x,t)U_2(x,t)\rangle}{\langle U_2(x,t)U_2(x,t)\rangle}\right\}$$

where the expression actually employed denotes some local averaging operation, an expectation estimation, and/or time and space averaging.

Moreover, one can use path-length integrals for approximation so as to obtain a wave based approximation to any integral of the form used in ray based modeling. For example, in some embodiments, the following expression 17 may be used successfully:

$$A(x') = e^{-f(x')v(x')\Delta t} \xrightarrow{yields} \ln\left\{\frac{U(x,t)}{U_2(x,t)}\right\} \cong \int_0^l f(x'(l'))dl'$$

Furthermore, one can use integrals by spatial extrapolation for solving wave equations. In some embodiments, one-way spatial extrapolation can be used, including the following non-limiting examples, downward extrapolation in depth, tilted coordinate frames, or as those with skill in the art will recognize, any suitable, generalized coordinate system. In such embodiments, one can approximate an integral in the extrapolation variable using similar techniques to those described above for time extrapolation. For example, for one way extrapolation in depth z $$A(x',z') = e^{-f(x',z')\Delta z} \xrightarrow{yields} \ln\left\{\frac{U(x,z)}{U_2(x,z)}\right\} \cong \int_0^z f(x',z')dz'$$

and this expression 18 can be used to convert to a path length integral or time integral; in some embodiments, this can be calculated, estimated, and/or derived from the group of equations 19, which can be expressed as:

$$A(x',z') = e^{-f(x',z')\frac{1}{\cos\theta}\Delta z} \xrightarrow{yields} \ln\left\{\frac{U(x,z)}{U_2(x,z)}\right\}$$

$$\cong \int_0^z f(x',z')\frac{1}{\cos\theta}dz' = \int_0^{l(z)} f(x',z'(l'))dl'$$

$$A(x',z') = e^{-f(x',z')\frac{1}{v\cos\theta}\Delta z} \xrightarrow{yields} \ln\left\{\frac{U(x,z)}{U_2(x,z)}\right\}$$

$$\cong \int_0^z f(x',z')\frac{1}{v\cos\theta}dz' = \int_0^{\tau(z)} f(x',z'(t'))dt'$$

Figure 8:
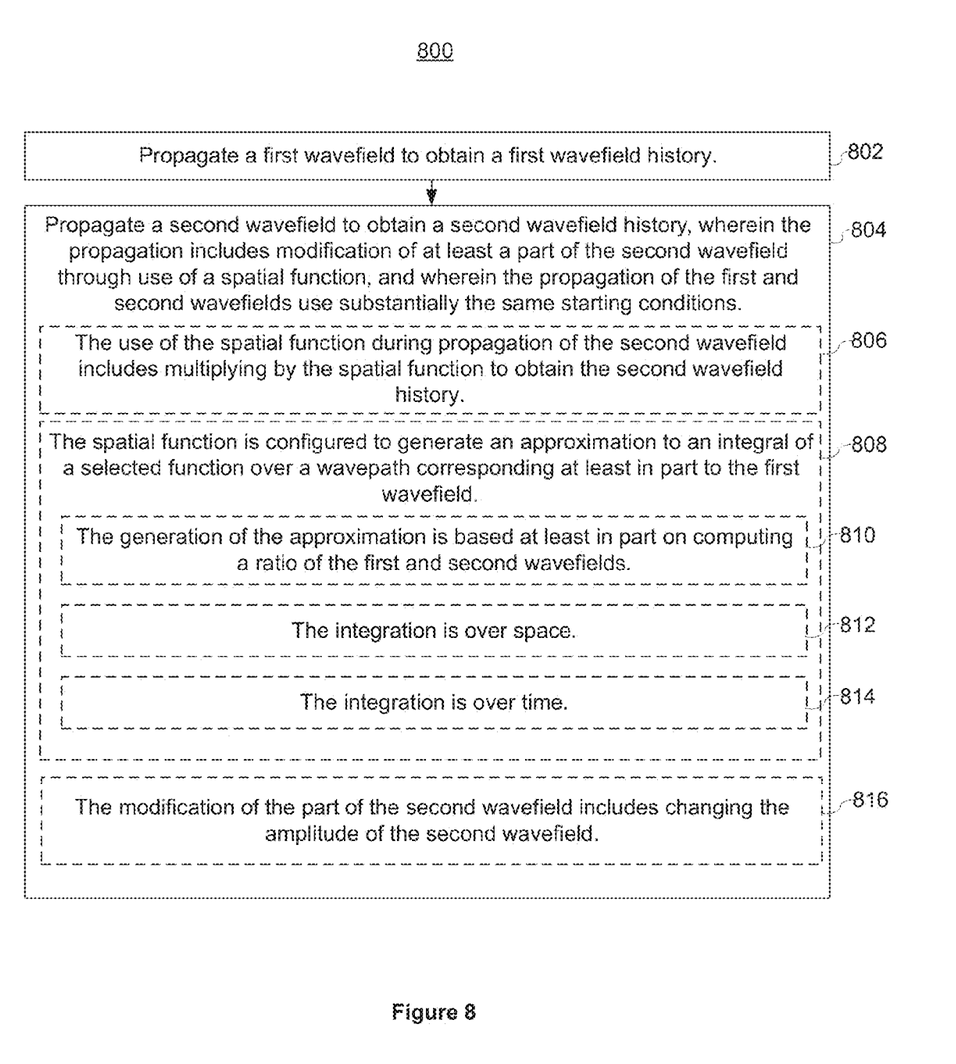
FIG. 8 is a flow diagram illustrating a method of processing and imaging collected data in accordance with some embodiments.

Attention is now directed to FIG. 8, which is a flow diagram illustrating a method 800 of processing and imaging collected data in accordance with some embodiments. Some operations in method 800 may be combined and/or the order of some operations may be changed. Further, some operations in method 800 may be combined with aspects of the example workflows of FIG. 2 and/or FIG. 7, and/or the order of some operations in method 800 may be changed to account for incorporation of aspects of the workflow illustrated by FIGS. 2 and/or 7.

The method 800 is performed at a computing device (e.g., computing system 100, FIG. 1).

In general, method 800 includes receiving a first and a second wavefield comprising collected data that corresponds to a subsurface region. In some embodiments the subsurface region is a subterranean region, and the collected data is seismic data, although techniques of method 800 may be applied in other domains such as gravity, magnetics, etc.

The method 800 also includes propagating (802) a first wavefield to obtain a first wavefield history (e.g., FIG. 2, step 202, 212).

The method 800 also includes propagating (804) a second wavefield to obtain a second wavefield history, wherein the propagation includes modification of at least a part of the second wavefield through use of a spatial function (such as a spatial variable function), wherein the propagation of the first and second wavefields use substantially the same starting conditions (e.g., such as initial conditions to the wave equation, including, but not limited to the examples of source functions, receiver wavefields, receiver data boundary values, etc.) (e.g., FIG. 2, step 204, 214).

Those with skill in the art will also understand that variations in injection methods can be used for the first and second wavefields, such as when there is an attenuation factor related to or associated with the injection point.

In some embodiments, the use of the spatial function during propagation of the second wavefield includes multiplying by the spatial function to obtain the second wavefield history (806).

In some embodiments, the spatial function is configured to generate an approximation to an integral of a selected function over a wavepath corresponding at least in part to the first wavefield (808); and in some embodiments, a wavefield combination is also used during the approximation of the integral of the selected function.

In some embodiments, the generation of the approximation is based at least in part on computing a ratio of the first and second wavefields (810). In some embodiments, the computation of the ratio is performed by estimating a ratio in a stable manner, i.e., so as to avoid dividing by zero with respect to a wavefield being adjusted by the calculation.

In some embodiments, the integration is over space (e.g., the integration domain is space) (812).

In some embodiments, the integration is over time (e.g., the integration domain is time) (814).

In some embodiments, the approximation of the integral of the selected function over the wavepath 808 is selected from the group consisting of: integration of a given spatial property of a raypath; integration of a function over the length of the raypath; integration of time along the raypath; integration of effective Q along the raypath; integration of time perturbation along the raypath; integration of one or more uncertainty metrics along the raypath; integration of path-length; and integration for spatial extrapolation for solving one or more wave equations.

In some embodiments, the modification of the part of the second wavefield includes changing the amplitude of the second wavefield (816).

In some embodiments, after obtaining the second wavefield history, those with skill in the art could perform one or more aspects of methods 700 and/or 200 in conjunction with or in combination with the results of method 800, including, but not limited to, estimating one or more attenuated traveltime histories, calculating one or more Q-model filters, generating one or more adjusted wavefield histories based at least in part on the application of the one or more Q-model filters, etc.

While certain implementations have been disclosed in the context of seismic data collection and processing, those with skill in the art will recognize that the disclosed methods can be applied in many fields and contexts where data involving structures arrayed in a three-dimensional space may be collected and processed, e.g., medical imaging techniques such as tomography, ultrasound, MRI and the like, SONAR and LIDAR imaging techniques and the like.

The steps in the processing methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

Various references that provide further information have been referred to above, and each is incorporated by reference.

Aki, K. and P. G. Richards, 1980, Quantitative seismology: Theory and methods, v.1: W.H. Freeman and Co.

Bickel, S. H., and R. R. Natarajan, 1985, Plane-wave Q-deconvolution: Geophysics, 50, 1426-1439.

Carcione, J. M., D. Kosloff, and R. Kosloff, 1988, Viscoacoustic wave propagation simulation in the earth: Geophysics, 53, 769-777.

Carcione, J. M., 2010, A generalization of the Fourier pseudospectral method: Geophysics, 75, A53-A56.

Causse, E., and B. Ursin, 2000, Viscoacoustic reverse-time migration: Journal of Seismic Exploration, 9, 165-184.

Cavalca, M., and R. Fletcher, 2009, Estimation of the near-surface Q distribution from pre-stack surface seismic data: SEG/EAGE Research Workshop, Barcelona, Expanded Abstracts.

Cavalca, M., I. Moore, L. Zhang, S. L. Ng, R. Fletcher and M. Bayly, 2011, Ray-based tomography for Q-estimation and Q-compensation in complex media: $73^{rd}$ EAGE Conference & Exhibition, Extended Abstracts.

Deng, F., and G. A. McMechan, 2007, True-amplitude prestack depth migration: Geophysics, 72, S155-S166.

Ferber, R., 2005, A filter bank solution to absorption simulation and compensation: $75^{th}$ Annual International Meeting, SEG, Expanded Abstracts, 2170-2172.

PCT Int'l Publication Number WO 2006/025823 A1, Publication date 9 Mar. 2006, Method for correcting input seismic traces from dissipative effects Fletcher, R. P., X. Du, and P. J. Fowler, 2009, Reverse time migration in titled transversely isotropic (TTI) media: Geophysics, 74, 179-187.

Fowler, P. J., X. Du, and R. P. Fletcher, 2010a, Coupled equations for reverse time migration in transversely isotropic media: Geophysics, 75, 11-22.

Fowler, P. J., X. Du, and R. P. Fletcher, 2010b, Recursive integral time extrapolation methods for scalar waves: $80^{th}$ Annual International Meeting, SEG, Expanded Abstracts, 3210-3215.

Hargreaves, N. D., and A. J. Calvert, 1991, Inverse Q filtering by Fourier transform: Geophysics, 56, 519-527.

Robertsson, J. O. A., J. O. Blanch, and W. W. Symes, 1994, Viscoelastic finite-difference modelling: Geophysics, 59, 1444-1456.

Yu, Y., R. S. Lu, and M. D. Deal, 2002, Compensation for the effects of shallow gas attenuation with viscoacoustic wave equation migration: 72nd Annual International Meeting, SEG, Expanded Abstracts, 2062-2065.

Zhang, Y., P. Zhang, and H. Zhang, 2010, Compensating for visco-acoustic effects in reverse-time migration: $80^{th}$ Annual International Meeting, SEG, Expanded Abstracts.

What is claimed is:

1. A method, comprising:
propagating a first wavefield to obtain a first wavefield history;
propagating the first wavefield to obtain a second wavefield history, wherein the propagation includes integration of one or more Q-effects;
estimating a first attenuated traveltime history based at least in part on the first and second wavefield histories;
calculating a first Q-model filter based at least in part on the first estimated attenuated traveltime history;
generating a first adjusted wavefield based at least in part on application of the first Q-model filter to the first wavefield; and
generating an image based at least in part on the first adjusted wavefield and a second wavefield.

2. The method of claim 1, further comprising:
propagating a second wavefield to obtain a third wavefield history;
propagating the second wavefield to obtain a fourth wavefield history, wherein the propagation includes integration of one or more Q-effects;
estimating a second attenuated traveltime history based at least in part on the third and fourth wavefield histories;
calculating a second Q-model filter based at least in part on the second estimated attenuated traveltime history; and
generating a second adjusted wavefield based at least in part on application of the second Q-model filter to the second wavefield.

3. The method of claim 2, further comprising generating an image based at least in part on the first wavefield and the second adjusted wavefield.

4. The method of claim 2, further comprising generating an image based at least in part on the first adjusted wavefield and the second adjusted wavefield.

5. The method of claim 4, further comprising:
before generating the image, scaling the first and second adjusted wavefields to generate scaled first and second adjusted wavefields, respectively, that are used to generate the image.

6. The method of claim 1, wherein the first wavefield is a source wavefield, and propagation of the first wavefield to obtain a first wavefield history includes forward propagation.

7. The method of claim 1, wherein the first wavefield is a receiver wavefield, and propagation of the first wavefield to obtain a first wavefield history includes backward propagation.

8. The method of claim 1, wherein the first wavefield is ordered based on time as a fast dimension.

9. The method of claim 1, further comprising:
scaling the first Q-model filter to generate a scaled Q-model filter;
generating a third adjusted wavefield based at least in part on application of the scaled Q-model filter to the first wavefield; and
generating an image based at least in part on the third adjusted wavefield and a second wavefield.

10. The method of claim 1, further comprising:
before generating the image, scaling the first adjusted wavefield to generate a scaled first adjusted wavefield that is used to generate the image.

11. The method of claim 1, wherein the one or more Q-effects are selected from the group consisting of attenuation, absorption, dissipation, and visco-acoustic effects.

12. The method of claim 1, wherein the first Q-model filter is configured to compensate for one or more attributes to be integrated along a wavepath corresponding at least in part to the first wavefield.

13. A computing system, comprising:
at least one processor;
at least one memory;
and one or more programs stored in the at least one memory, wherein the one or more programs are configured to be executed by the one or more processors, the one or more programs including instructions for:
propagating a first wavefield to obtain a first wavefield history;
propagating the first wavefield to obtain a second wavefield history, wherein the propagation includes integration of one or more Q-effects;
estimating a first attenuated traveltime history based at least in part on the first and second wavefield histories;
calculating a first Q-model filter based at least in part on the first estimated attenuated traveltime history;
generating a first adjusted wavefield based at least in part on application of the first Q-model filter to the first wavefield; and
generating an image based at least in part on the first adjusted wavefield and a second wavefield.

* * * * *